United States Patent
King et al.

(10) Patent No.: US 11,528,205 B2
(45) Date of Patent: *Dec. 13, 2022

(54) TUNNELED MONITORING SERVICE AND METHOD

(71) Applicant: Covenant Eyes, Inc., Owosso, MI (US)

(72) Inventors: Jason King, Hudsonville, MI (US); Jeffrey M. Wofford, Ovilla, TX (US); Patrick Smith, Henderson, MI (US); Scott Hammersley, Oakley, MI (US); Ronald Dehaas, Owosso, MI (US)

(73) Assignee: COVENANT EYES, INC., Owosso, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/006,426

(22) Filed: Jun. 12, 2018

(65) Prior Publication Data

US 2018/0295043 A1    Oct. 11, 2018

Related U.S. Application Data

(63) Continuation of application No. 14/920,616, filed on Oct. 22, 2015, now Pat. No. 10,097,436.

(Continued)

(51) Int. Cl.
*H04L 43/0876* (2022.01)
*H04L 12/46* (2006.01)
(Continued)

(52) U.S. Cl.
CPC ...... *H04L 43/0876* (2013.01); *H04L 12/4633* (2013.01); *H04L 47/825* (2013.01); *H04L 61/2592* (2013.01)

(58) Field of Classification Search
None
See application file for complete search history.

(56) References Cited

U.S. PATENT DOCUMENTS 8,839,350 B1 *    9/2014   McNair ............... H04L 63/20
                                                   726/1
9,043,944 B2 *    5/2015   Ronaldi .......... H04L 63/0227
                                                   726/30
(Continued)

FOREIGN PATENT DOCUMENTS

WO        2014018145 A1    1/2014

OTHER PUBLICATIONS

Office Action issued against corresponding Canadian Patent Application No. 2965513 dated Sep. 2, 2020 (3 pages).
(Continued)

*Primary Examiner* — Jutai Kao
(74) *Attorney, Agent, or Firm* — Fitch, Even, Tabin & Flannery, LLP

(57) ABSTRACT

Some embodiments provide systems and methods to monitor network communications, comprising: a computing device comprising a control circuit and memory with instructions executed by the control circuit to implement: a tunneled monitoring service (TMS) operated local on the mobile computing device; and a tunnel protocol within the mobile computing device that is configured to establish a tunnel interface between software applications and the TMS, wherein the tunnel interface is configured to collect output data transactions, communicated by the software applications, and direct the output data transactions to the TMS; wherein the TMS is configured to initiate a monitoring of each output data transaction relative to predefined criteria to identify relevant parameter information, obtained from one or more of the output data transactions, that have a predefined relationship with one or more of the criteria, and cause results of the monitoring relative to the criteria to be recorded.

15 Claims, 6 Drawing Sheets

Related U.S. Application Data

(60) Provisional application No. 62/067,816, filed on Oct. 23, 2014.

(51) Int. Cl.
  *H04L 47/70* (2022.01)
  *H04L 61/2592* (2022.01)

(56) References Cited

U.S. PATENT DOCUMENTS

| | | | | |
|---|---|---|---|---|
| 10,097,436 | B2* | 10/2018 | King | H04L 43/0876 |
| 2004/0083354 | A1* | 4/2004 | Kunze | G06F 15/8007 |
| | | | | 712/248 |
| 2004/0199763 | A1* | 10/2004 | Freund | G06F 21/53 |
| | | | | 713/154 |
| 2010/0174812 | A1 | 7/2010 | Thomas et al. | |
| 2012/0087235 | A1 | 4/2012 | Smith et al. | |
| 2012/0131222 | A1* | 5/2012 | Curtis | H04L 47/2441 |
| | | | | 709/235 |
| 2013/0276054 | A1* | 10/2013 | Martini | H04N 9/79 |
| | | | | 726/1 |
| 2014/0105044 | A1 | 4/2014 | Baillargeon | |
| 2014/0189095 | A1 | 7/2014 | Lindberg et al. | |
| 2014/0229605 | A1 | 8/2014 | Besser | |
| 2015/0347487 | A1* | 12/2015 | Cohan | H04L 63/0263 |
| | | | | 726/4 |
| 2015/0358352 | A1* | 12/2015 | Chasin | H04L 63/126 |
| | | | | 726/22 |
| 2015/0370909 | A1* | 12/2015 | Volach | H04N 21/4788 |
| | | | | 707/722 |
| 2015/0379287 | A1* | 12/2015 | Mathur | G06F 21/6209 |
| | | | | 726/27 |
| 2016/0149863 | A1* | 5/2016 | Walker | G06F 21/606 |
| | | | | 726/1 |
| 2017/0201489 | A1* | 7/2017 | Chan | G06F 16/22 |

OTHER PUBLICATIONS

International Search Report for PCT/US15/56921 dated Mar. 31, 2016 (4 pages).

Xiaoming Kou, Qiaoyan Wen; Intrusion detection model based on Android; Broadband Network and Multimedia Technology (IC-BNMT), 2011 4th IEEE International Conference on, Oct. 28, 2011, IEEE; pp. 624-628.

Guojun Peng, Yuru Shao, Taige Wang, Xian Zhan, Huanguo Zhang; Research on android malware detection and interception based on behavior monitoring; Wuhan University Journal of Natural Sciences, Nov. 4, 2012, Wuhan University, Heidelberg; vol. 17, Nr.:5, pp. 421-427.

\* cited by examiner

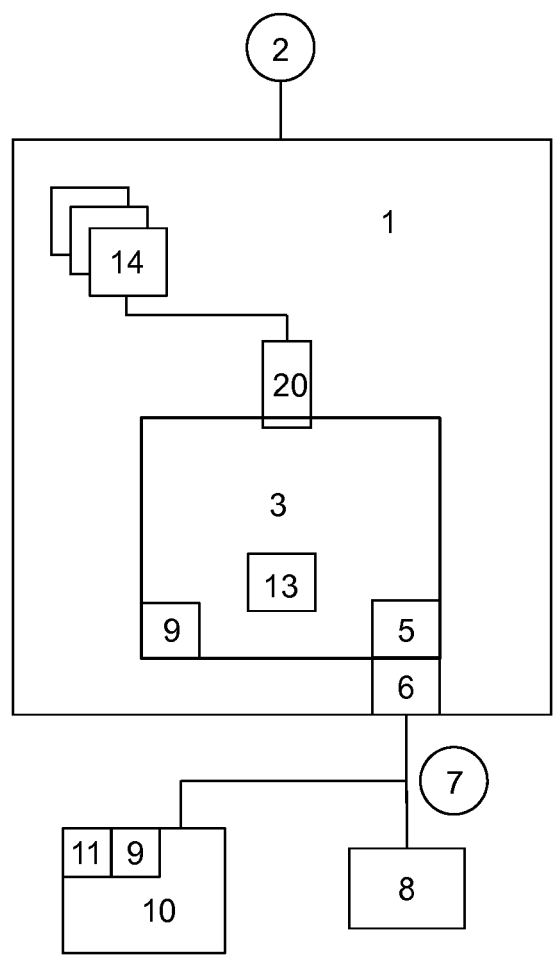
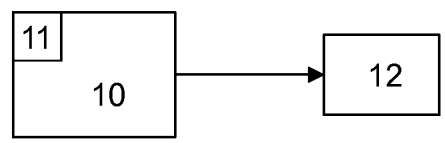
FIG. 1
FIG. 2

TUNNELED MONITORING SERVICE AND METHOD

CROSS REFERENCE TO RELATED APPLICATIONS

This application is a continuation of U.S. application Ser. No. 14/920,616 filed on Oct. 22, 2015, which claims the benefit of U.S. Provisional Application No. 62/067,816, filed Oct. 23, 2014, entitled TUNNELED MONITORING SERVICE AND METHODS, for Jason King et al., the entire content of each of which is incorporated herein by reference.

FIELD

Services and methods of monitoring a local computing device, and in particular monitoring requests of a local computing device.

BACKGROUND

Many computing devices communicate with external devices. Such external communications, however, can subject the computing device to security issues. Similarly, such external communications may be intercepted.

Some systems limit external communications from a computing device. Further, some systems utilize a service and/or process of trying to protect content received by and/or communicated from the computing device.

SUMMARY

Described herein are services and methods of monitoring a local computing device. Some embodiments comprise monitoring a local computing device by capturing data transactions on a local computing device, analyzing the data transactions from the local computing device, and completing a predetermined requested data transaction. In some embodiments, an additional step of monitoring for third party use is introduced.

Some embodiments provide systems to monitor network communications, comprising: a mobile computing device comprising a control circuit and memory coupled with the control circuit and computer instructions that when executed by the control circuit cause the control circuit to implement: a tunneled monitoring service (TMS) operated local on the mobile computing device; and a tunnel protocol within the mobile computing device that is configured to establish a tunnel interface between software applications operating on the computing device and the TMS, wherein the tunnel interface is configured to collect output data transactions, communicated by the software applications and intended to be externally communicated from the computing device over a distributed communication network, and direct the output data transactions to the TMS; wherein the TMS is configured to initiate a monitoring of each output data transaction relative to predefined criteria to identify relevant parameter information, obtained from one or more of the output data transactions, that have a predefined relationship with one or more of the criteria, and cause results of the monitoring relative to the criteria to be recorded.

Further, some embodiments provide methods of monitoring network communications, comprising: by a control circuit of a mobile computing device: implementing, local on the mobile computing device, a tunneled monitoring service (TMS); implementing, through a tunnel protocol within the mobile computing device, a tunnel interface between software applications operating on the computing device and the TMS; collecting, through the tunnel protocol, output data transactions communicated by the software applications and intended to be externally communicated from the computing device over a distributed communication network; directing, by the tunnel protocol, the output data transactions to the TMS; initiating, by the TMS, monitoring of each output data transaction relative to predefined criteria to identify relevant parameter information, obtained from one or more of the output data transactions, that have a predefined relationship with one or more of the criteria; and causing results of the monitoring relative to the criteria to be recorded.

BRIEF DESCRIPTION OF THE DRAWINGS

FIG. 1 illustrates a simplified block diagram of an exemplary Tunneled Monitoring Service (TMS) implemented in a system and configured, at least in part, to monitor data transactions, in accordance with some embodiments.

FIG. 2 illustrates a simplified block diagram of an exemplary Tunneled Monitoring Service (TMS), in accordance with some embodiments, comprising a remote server configured to send a report to a third party recipient.

DESCRIPTION

Figure 3:
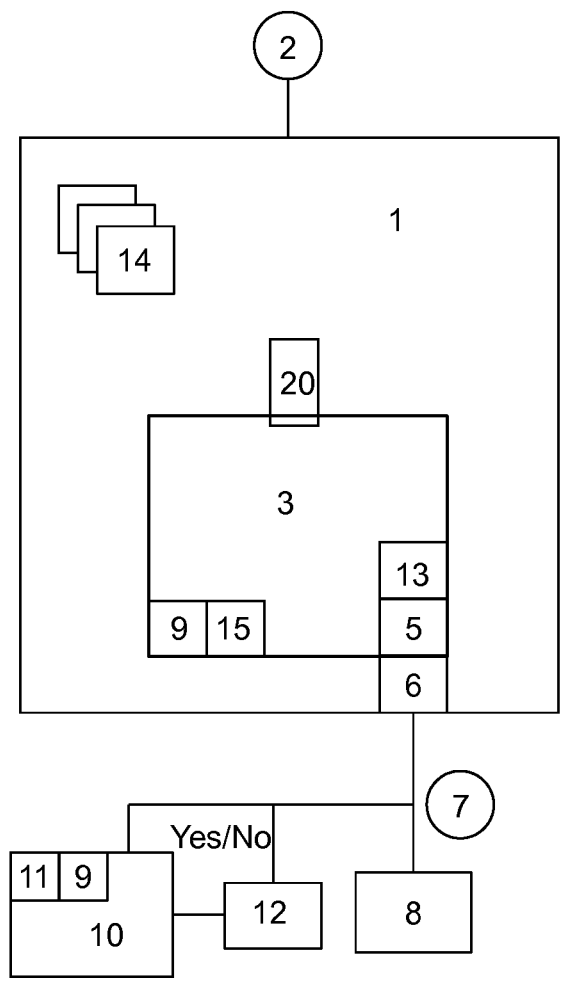
FIG. 3 illustrates a simplified block diagram of an exemplary Tunneled Monitoring Service (TMS) implemented in a system, in accordance with some embodiments.

In some instances, a third party or remote server may monitor data transactions, or metadata about data transactions, originating from a local computing device. Interest in monitoring a local computer's access and activities may be desired for a variety of reasons such as, for example, a desire to maintain accountability while using the local computing device. Interest may also arise from a desire or need of a corporation to monitor use of its local computer devices such as, for example, in the interest of fulfilling government Sarbanes/Oxley requirements, medical law compliance, company policies, and the like.

Some existing monitoring programs can be installed directly on a computing device. For instance, one Internet monitoring service operating under the trade name Covenant Eyes (covenanteyes.com) provides monitoring of all browser activity and reports the results of that monitoring to a third party recipient (See generally, U.S. Pat. Nos. 8,255, 514 and 8,671,192 the disclosures of which are incorporated herein in their entirety). Other services, including those operating under the trade names of Covenant Eyes, Net Nanny (netnanny.com), x3watch (x3watch.com) and the like, provide filtering that blocks access to sites on browsers of local computing devices.

Despite these advances in the art, one disadvantage of these services is that they typically monitor data from specific protocols and applications residing on the local computing device from which the activity being monitored is implemented. With the advent of mobile computing devices and/or operating systems of some mobile computing devices, such as those sold under the trade name of ANDROID or iOS, most applications run separately from the monitoring applications, and therefore are typically unmonitored.

Some existing systems utilize Virtual Private Networks (VPN's), which use a tunnel interface to receive all packets of data transaction requests from the local computing device. VPN's receive packets, encrypt them, and use a VPN "service" (i.e., a program residing on the local computing device and operates constantly, independent of user input) to send the packets to a dedicated remote VPN server, which in turn decrypts (de-encrypts) the packets and sends the output to a Wide Area Network (WAN) such as the Internet. VPN's provide an excellent way of providing a secure, private network that allows other users within the network to access data in its encrypted form, and then decrypt it for local use; they often allow all data transactions to be encrypted without ever being decrypted in the WAN. However, a disadvantage of a VPN service is that in order to make data transactions with a WAN, they generally require the VPN to be a Certificate Authority and hold a Public Key Certificate. They typically further require the encryption/decryption of data. They typically further require a remote server, which acts as a remote VPN server, to complete data transactions between the local computing device and the WAN. VPNs typically do not perform monitoring and are not configured to perform monitoring. Even if the current technologies of monitoring programs were combined with the technologies of VPN's, these disadvantages would still appear.

The advent of mobile devices allows many applications to concurrently operate which results in a multitude of applications that constitute and/or implement unique data transaction requests. However, these requests are often not accessible to other applications residing on the same device, such as a monitoring program. Some processes provided by mobile computing device manufacturers, such as those intended to operate with Android and iOS, that allow all of the data packets from all of the installed applications to be received include a VPN by means of a tunneling interface such as VTun. The VPN's in those cases have all of the disadvantages of the VPN's discussed above.

Some present embodiments, however, provide methods and services (e.g., software programs residing on a local computing device, which may operate continuously, independent of user input) that do not require (although they may permit) encryption or decryption of incoming packets, nor do they require remote servers, but receives the data transaction requests and typically all of the data transaction requests, and uses, for both input and output of data, a tunnel interface, which in some implementations may be similar to that used by VPN's (again, as described above, VPN's currently are the only accessible way that all data transaction requests from all applications can be collectively received by a single service that uses servers separate from the local computing device), and which then completes the transaction for the user of the local computing device. In some embodiments, the services and/or methods may further log data or metadata of the one or more transactions. The data or metadata may be made accessible through the computing device and/or accessible to a remote server or a third party recipient without the use of a VPN.

According to some embodiments, a computer apparatus, service and method, generally referred to as a "tunneled monitoring service" (TMS), is configured to collect external outbound and inbound data transactions, which in some instances includes data requests, and typically all external data transactions from and/or to a selected computing device on which the TMS is implemented. The TMS utilizes a tunneling protocol, such as VTun, and monitors and/or analyzes output and input data transactions, such as data transactions resulting from external data requests. Further, in some implementations, the TMS receives packets of data from the local computing device, through the tunnel interface, examines the packet (with or without decrypting encrypted information), provides the results of the monitoring and/or the analyses to a remote server or third party user, establishes a requested connection, and completes the data transfer ("outbound" or "output") over a Wide Area Network (WAN) such as the Internet, Local Area Network (LAN), or substantially any external communication network. When there are resulting one or more input or inbound data transactions from the WAN, the input data transaction is transferred back to the local computing device, through the TMS and the tunnel interface to the requesting application on the computing device. The TMS, in some implementations, further monitors some or all of the resulting inbound or input data transactions. The output/input (or sometimes referred to as outbound/inbound) process is generally referred to below, singularly or collectively, as the "data transaction."

Some embodiments are illustrated in the attached exemplary figures and described below, but various modifications and improvements thereon will become readily apparent to those skilled in the art. For example, the TMS described herein could, as a stand-alone service without a network such as a VPN, be a Certificate Authority and hold a Public Key Certificate, which would act as a "man-in-the-middle" service, which would allow monitoring even of data that is encrypted such as the https protocol.

To present an overall understanding of the present embodiments, certain illustrative embodiments will now be described. However, it will be understood by one of ordinary skill in the art that the systems described herein can be adapted and modified to provide systems for other suitable applications and that other additions and modifications can be made to the present embodiments without departing from the scope hereof.

FIG. 1 shows a simplified block diagram of an exemplary system implementing a Tunnel Monitoring Service (TMS) 3 in accordance with some embodiments. A local computing device 1 is used by a selected user 2. The local computing device can be substantially any processor operated computing device that implements software applications 14 and can communicate external to the computing device 1 in sending and/or receiving information. For example, the local computing device can be a computer, laptop, a mobile personal user interface unit or device, such as but not limited to a smart phone, a tablet, and other such mobile devices, and other such computing devices. Typically, the local computing device 1 includes and/or has installed thereon a number of various applications 14 (e.g., web browser application, mapping application, financial application, etc.). In some embodiments, the TMS 3 is implemented through hardware and/or software, and typically is implemented on the local computing device 1. The TMS 3 can either come pre-installed on the computing device 1 or be installed at a later time either voluntarily or involuntarily by the user 2 or other entity (e.g., employer). When an output data transaction request, and typically any data transaction request, is made by the local computing device 1 (e.g., from one or more applications operating on the computing device), the data packets of the request pass through a tunnel 20 or tunnel interface and are directed by the tunnel to be received by the TMS 3. The data request may, as one example, include a request to establish a specified connection to a remote, external intended recipient server or service 8 over a Wide Area Network (WAN) 7 such as the Internet. Other requests may include the transfer of information or data between the computing device 1 and an external intended recipient computing device (e.g., an external server with which a connection has been established; another mobile computing device; etc.).

Often the tunnel is implemented through known tunnel applications, such as VTun or other such tunnel applications. In some implementations, a tunnel protocol within the mobile computing device 1 is configured to establish a tunnel interface between software applications 14 operating on the computing device and the TMS 3. The tunnel 20 is configured to receive all network communications directed external to the computing device 1, but does not direct the communications to an external server. Instead, the tunnel 20 directs these output data transactions to the TMS 3. As such, in some applications the tunnel interface is configured to collect output data transactions, communicated by the software applications 14 and intended to be externally communicated from the computing device over one or more distributed communication networks, and direct the output data transactions to the TMS.

Similarly, reply communications and/or all incoming communications to the computing device are directed to the TMS 3 prior to being forwarded to an intended application 14 being implemented on the computing device. Accordingly, the TMS 3 effectively intercepts communications directed from and to the computing device. The TMS is further configured to read raw packets from the tunnel 20 of these data transactions to allow for monitoring and/or analysis of these communications and/or requests. However, in intercepting packets and monitoring the packets the TMS 3 disrupts the communication of packets and, as is understood in the art, typically makes the raw data packets incapable of being forwarded and/or correctly received by an external intended recipient server 8, service or other intended recipient device (generally referred to below as server 8, but those in the art will appreciate that the recipient device is not limited to a web server).

The TMS 3 comprises request circuitry, processor and/or processing functionality 5, implemented through hardware and/or software, that in part receives the raw data packets from the tunnel 20, allows for monitoring and/or analysis, and completes data transactions. The TMS 3 can further establish the connection specified in the original data packet through Input/Output interface and/or software 6 with the intended external recipient server and/or source. The request processing functionality 5 is further configured to cause the re-packetizing and/or re-packetize open or raw data packets and/or some or all of a payload of a data packet such that new re-packetized data packets are created, which may contain some or all of the payload of the original data packets, but with the TMS as the requesting application. As such, responses from a remote source address replies to the TMS as the intended recipient instead of the source application that issued the original data transaction. Some embodiments may additionally include a packet intermediary component 13 of TMS 3. The packet intermediary component, at least in part, acts as an intermediary for the communication connection between the applications 14 on the computing device with the one or more remote servers 8, 10. In some instances, the mediation performed by the packet intermediate component is performed such that at least the applications 14 and in some instances the remote servers believe they are communicating with each other.

In some implementations, the TMS is configured to initiate a monitoring of each output and/or input data transaction. The monitoring can include monitoring relative to predefined criteria to identify relevant parameter information, obtained from one or more of the data transactions, that have a predefined relationship with one or more of the criteria. In some applications and/or with some criteria, the TMS 3 can be configured to perform monitoring of data transactions intended to be communicated from and/or to the computing device. The monitoring can include, but is not limited to, one or more of examining said data packets, logging requested visits (e.g., nature, time, and the like), saving other data and metadata about the data packets, and the like. Additionally or alternatively, the TMS can cause data transactions and/or parts of data transactions to be forwarded to a remote server and/or evaluation service to perform the monitoring. The TMS can further cause results of the monitoring relative to the criteria to be recorded locally on the computing device and/or remotely (e.g., server 10, third party server, etc.).

In some instances the TMS 3 can complete the intended communication between an original source application on the computing device and a remote source. Accordingly, the TMS 3 can complete the intended communication by sending data over a distributed communication network 7 (e.g., the WAN, Internet, etc.) to, for example, an intended external and remote server 8, which may be able to provide requested data, and may, for instance, be the host of a website requested, or a game, or email, or the like. Again, the new re-packetized data packets specify the TMS as the sender, and as such subsequent replies are directed to the TMS 3 instead of the original source application on the computing device 1. When requested connectional information is received by the TMS 3 as input from server 8 via the WAN 7, request processing functionality 5 may, in some implementations, access the raw data packets and allow monitoring, and in some embodiments may further allow some analysis. The results of the monitoring and/or analysis can be locally stored and/or communicated to a relevant external device.

In some embodiments, the TMS 3 further comprise a built-in monitoring circuitry, processor and/or monitoring functionality 9 that can be implemented through hardware and/or software. The monitoring functionality 9 is configured to receive data from the request processing functionality 5. The monitoring functionality 9 is configured to evaluate the output and input data packets relative to one or more monitoring criteria and/or monitoring functions in detecting relevant parameter information of interest. The monitoring criteria can include substantially any relevant criteria that may be of interest and/or concern to a company, employer, user, parent, law enforcement agency, and the like. For example, some monitoring criteria may include, but is not limited to, counting a number of bytes, identifying one or more key words (e.g., profanity, derogatory words, customer names, competitors names, and the like) that may be predefined or detected over time, identifying a certain color, detecting a predefined website address, detecting a certain image, detecting a part of an image, detecting an image of a human face, detecting an image of a portion of a human body, and other such monitoring.

Accordingly, some embodiments advantageously utilize the tunnel protocol 20 implemented on a computing device 1 to direct intended data transactions to and from the TMS to allow the TMS to locally access the data packets on the computing device and initiate monitoring of tunneled data packets being communicated from and to the computing device 1 relative to criteria. The TMS 3 is registered with the tunnel and/or the operating system as the receiving tunnel service of the tunneled data. Further, the monitoring is performed without requiring the data transactions to be remotely communicated from the computing device 1 to a predefined single intended service or server (e.g., without communicating to a VPN server, or the like). Instead, the TMS 3 operates local on the computing device 1 and communicationally cooperates with the tunnel protocol 20 that directs data transactions to the TMS instead of directly to an I/O interface 6 of the computing device. In some applications, the TMS activates software in the TMS (e.g., monitoring functionality) to implement the monitoring of the output and/or input data transactions relative to the criteria and identify the relevant parameters that have the predefined relationship relative to the criteria.

The TMS 3 intercepts the data packets of output and input data transactions. This interception, however, interferes with the ability to communicate the data packets. Typically, the operating systems operating with a tunnel protocol do not provide for the ability of a raw data packet to be forwarded. Further, in some implementations, the TMS 3 receives raw data packets via the tunnel, and as is understood in the art received raw data packets typically cannot simply be sent on to an intended recipient. Accordingly, in some implementations the TMS extracts significant bytes of the data packets (e.g., HTTP payloads) and causes the operating system of the computing device to then route the extract portions as a payload in a re-packetized data packet. In some instances, the TMS may further cause other data of the raw packets (e.g., header data, etc.) to be stored (e.g., as metadata).

The TMS receives and/or opens the raw data packets to allow monitoring of one or more aspects and/or information of the data packets and/or within the payload of the data packets. As such, the TMS 3 utilizes a virtual network interface, namely the tunnel, to receive the output and/or input data transactions. The data transactions can then be monitored relative to one or more monitoring criteria. In many instances, the TMS 3 further causes the re-packetizing of at least the payloads and other relevant information of intercepted data packets, and identifies from the original data packets the intended recipient server such that new re-packetized data packets are generated.

In some implementations, the TMS forwards those portions of the payload of outbound raw data packets and/or modified payloads to the operating system of the computing device that generates the re-packetized data packets that are communicated from the computing device to a server or other intended destination. Further, in some applications, the TMS receives in-bound data packets and re-packetizes those portions of the payloads that are extracted and/or modified. The TMS then causes outbound re-packetized data packets to be communicated from the computing device 1 and over the distributed communication network to one or more of the original intended external servers, services and/or other such computing devices. Unlike the utilization of a VPN where the tunnel forces all external communications to be externally communicated over a network and directed to a predefined single VPN server, the TMS is configured to establish any number of different connections with any number of intended external servers. The opening of data packets such that the TMS receives the raw data packets (e.g., IP packets) further distinguishes the TMS from a VPN in that a VPN typically does not open the raw data packets to enable evaluation of the raw data packets, and instead may encrypt the data packets and encapsulates one or more encrypted data packets into an IP header containing routing information.

The re-packetized data packets are formatted with the TMS as the sending application. As such, subsequent responses from the external server are addressed to the TMS. This allows the TMS to receive the external incoming data transactions and access the incoming data packets to allow evaluations (e.g., monitoring) of the incoming data packets. The TMS can then, when appropriate based on criteria and/or analysis, cause the re-packetizing of the relevant portions of the data packets or re-packetize some or all of the payload of the input data packets and cause the re-packetized input data packets to be internally communicated within the computing device from the TMS to the original requesting application 14 on the computing device 1 intended to receive the input data packets. Further, in some implementations, the re-packetizing includes defining the source of the payload as the external server such that the re-packetized data packets appear to the receiving application 14 as being from the external server. Accordingly, in part, the TMS 3 operates as an intermediary between the one or more applications 14 operating on the computing device 1 and the multiple remote servers 8. When the tunnel 20 is active, the software applications 14 do not directly communicate with the external servers 8, and instead, the TMS intercepts the communications and operates as an intermediary between the applications 14 and external servers. The TMS further maintains records of the sending application 14, the intended recipient and other relevant information obtained, for example, from the header information and/or metadata of the received data packets. This information is utilized in re-packetizing the data packets, identifying intended servers for output data transactions, identifying intended applications 14 of input data transactions, and the like.

Again, in some embodiments, the TMS may change the payload during the process of re-packetizing the payload. Similarly, in some instances, the TMS may prevent the communication from being forwarded to the intended external server, and/or one or more packets and/or communications from the server may be prevented from being communicated to the intended application 14. This modification of payload and/or prevention of communications is initiated in response to monitoring and/or analysis of the data packets and/or the payload of the data packets.

In some implementations, the monitoring functionality 9 can further be configured to identify, track, log and/or record information based on the monitoring of the data transactions relative to one or more criteria, and send logged information and data to a company source, a third party server, the server 8, a second remote server 10, and/or one or more other relevant entities defined to receive the detected relevant parameter information corresponding to the criteria. Typically, the monitoring at least identifies and/or collects parameter information about the data transactions and/or data packets being communicated from and to the computing device 1 corresponding to one or more criteria, parameters, thresholds and the like. In some instances data packets of data transactions are monitored to identify and/or collect relevant parameter information from one or more of the output and/or input data packets that have a predefined relationship with one or more of the criteria. Additionally or alternatively, in some implementations a remote server (e.g., the second remote server 10) operates as an evaluation server and/or provides an evaluation service of some or all of the data transactions. In some instances, the remote server 10 can include monitoring functionality 9, such that some or all of the monitoring may be performed remote from the computing device 1. Some or all of the data packets can be communicated to the second remote server 10 to initiate some or all of the monitoring at the second remote server.

The monitoring, in some implementations includes evaluating header information, metadata, and/or payloads of data transactions relative to one or more criteria in order to obtain statistical information, track usage, log information, and the like. The criteria can include substantially any relevant criteria that may be detected. For example, criteria may specify keywords, domain, date, time, Internet-Protocol (IP) address of network access activity, one or more predefined terms, a company name, customer information, financial information, medical records information, whether an attachment is included, whether an image is included, whether a face or portion of a face is detected through facial recognition, whether a portion of a body is detected through image and/or video processing, other such criteria, and often a combination of two or more of such criteria. The monitoring can perform text and/or word searching, image processing, counting, and other such monitoring. The parameter information obtained through the monitoring can be logged, recorded and/or otherwise communicated to one or more remote parties and/or devices/servers. The parameter information can allow for an evaluation of network activity by the computing device 1 and/or user.

The second remote server 10 can, in some instances, be configured with further analysis software 11 which can perform additional logging, analysis, testing against rules, comparison with other downloadable data, sorting of data, and the like, in a form that is useful for other purposes, such as triggering an alarm when a rule is broken, identifying an action to be taken in response to one or more rules and cause the action to be initiated, and the like. As such, the remote server 10 provides an evaluation service to analyze one or more data transactions, data packets and/or payloads forwarded by the computing device. When a reply input data transaction with requested connectional information and/or other information is received by the TMS 3 as input from the server 8 via the WAN 7, the TMS 3 passes, when appropriate and/or not restricted based on the monitoring and/or analysis, the requested connectional information and/or payload back through the tunnel 20 to the appropriate application 14 residing on the local computing device 1, thereby completing the data transaction request. Again, in some instances, some or all of the requested information may be prevented from being sent to the requesting application, may be modified prior to being forwarded to the requesting application, and/or alternative content may be communicated to the requesting application, based on the monitoring and/or analysis of the request and/or the received requested information. The modification of a payload of one or more input and/or output data packets can be in response to an identification that data of a data packet has a predefined relationship with one or more rules. The modified payloads can be re-packetized in place of the original payload of the input data packet providing modified data packets and/or re-packetized data packets.

The analysis preformed at the second server 10 can include substantially any relevant analysis and often corresponds to analyzing data transactions and/or portions of data packets relative to one or more rules. These rules can correspond to inappropriate activities, rules that trigger one or more actions, rules that are used to identify patterns, rules relative to historical activity by one or more users, and other such rules. Some examples of rules can include, but are not limited to, prohibition on accessing one or more predefined website addresses, preventing the communication of pictures or pictures with predefined features (e.g., nudity, symbols, etc.), prohibition of one or more key words (e.g., profanity, derogatory words, customer names, competitors names, and the like) that may be predefined or detected over time, maximum data sizes, preventing communication of customer or patient information, limiting duration of time and/or a number of times a website is accessed, and the like. The rules may further correspond to one or more actions. For example, the communication may be prevented, some or all of the payload may be altered (e.g., removing portions of a payload, replacing some or all of a payload, etc.), notifying one or more individuals and/or entities (e.g., sending a warning to the user, sending a notice to an office manager, sending a notice to a corporate office, notifying a marketing department), adding content to a payload (e.g., advertising, warnings, etc.), and other such actions.

In some embodiments, the analysis can include assigning a score to each data transaction and/or network access activity. The score can be based on one or more rules, corresponding levels relative one or more of those rules, and/or number of rules that might be violated or for which a data transaction has a predefined relationship relative to one or more of the rules. For example, the score and the content provides an indication of whether the network access activity is considered an objectionable activity. One or more actions can correspond to rules and/or scores. These actions can include logging information, preventing an output data transaction from being communicated, preventing an input data transaction from being forwarded to a requesting application 14, a modification of a payload of a data packet, a notification to a user of the computing device 1, a notification to a third party (e.g., employer, government agency, tracking system, marketing company, etc.), causing the display of and/or inclusion of additional information and/or selection of information (e.g., targeted marketing), and other such actions corresponding to one or more rules.

FIG. 2 illustrates a modification of the system and method of FIG. 1, in which the second remote server 10 produces a report that is sent to a third party recipient 12 via direct or indirect (e.g., the Internet) connection. The report may include a numerical or other (such as alphabetical or color-coded) score, time and date of access, information about the contents of the requested data transaction, IP address of the local computing device, titles, keywords, rule violations, annotations (e.g., inputted by a user), and the like. This information may be obtained through the monitoring at the TMS, monitoring at the second server 10, and/or analysis relative to one or more rules at the second server and/or the TMS.

FIG. 3 illustrates a simplified block diagram of an exemplary Tunneled Monitoring Service 3 implemented in a system, in accordance with some embodiments. The system comprises an additional blocking circuitry, processor and/or blocking functionality 15 configured to prevent requested data transactions from being completed. The blocking functionality 15 can be implemented through hardware and/or software. In some embodiments, the blocking functionality 15 is included in the TMS 3 and/or is incorporated into circuitry and/or functionality components of the TMS. The second remote server 10 can be configured with further analysis software 11 which can perform additional logging, analysis, testing against rules, comparison with other downloadable data, sorting of data, and the like, in a form that is useful for other purposes, such as triggering an alarm when a rule is broken.

The rules may include a subset of rules which cause a signal (such as a Yes/No) to be returned from the second server 10 to the TMS 3 directly, or indirectly through monitoring functionality 9 or blocking functionality 15. In some implementations, the second remote server 10 and/or the third-party recipient 12 may issue a block action command, for example, based on the analysis of one or more data transactions and/or a determined relationship relative to one or more criteria and/or rules. The block action command can be communicated to the blocking functionality 15 of the TMS that prevents the TMS from externally communicating a re-packetized data transaction, and/or prevents some or all of one or more payloads of data packets from input data transactions from being forwarded to an application 14 on the computing device 1. For example, a rule may correspond to a particular user being under a certain age and/or one or more restrictions relative to the computing device may have been set (e.g., parental restrictions) relative to the particular user, with the rule preventing content that has images with nudity. The monitoring and/or analysis may detect nudity and based on the relationship to the nudity rule activate the blocking functionality 15 to prevent the payload of one or more data packets from reaching the requesting application 14. Under specified conditions, the second server 10 may send information and reports about the data transaction, including whether or not the transaction was blocked, to a third-party recipient 12.

Figure 4:
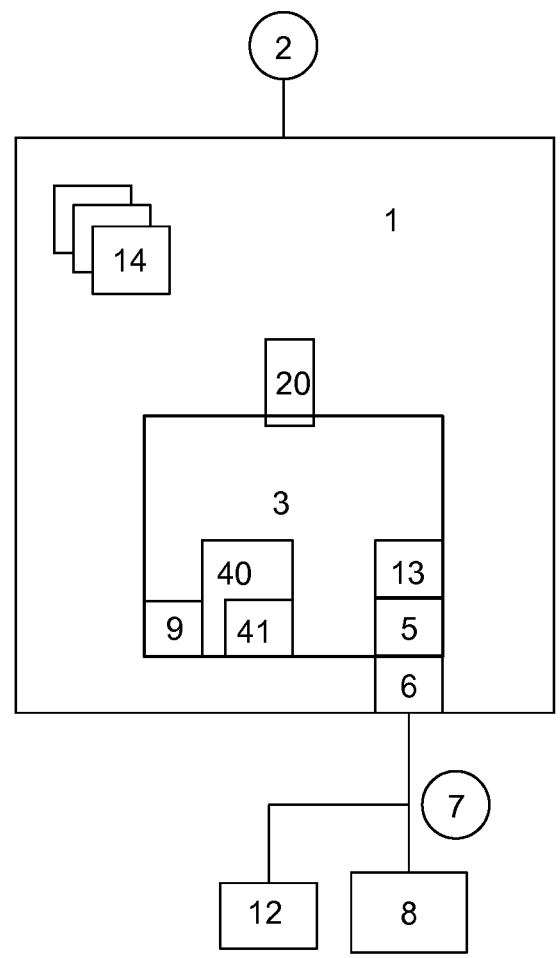
FIG. 4 shows a simplified block diagram of an exemplary Tunneled Monitoring Service (TMS) implemented in a system, in accordance with some embodiments, with monitored data recorded and analyzed.

FIG. 4 shows a simplified block diagram of an exemplary Tunneled Monitoring Service (TMS) 3 implemented in a system, in accordance with some embodiments that enables evaluations of data transactions. In some implementations, the system is configured to record monitored data and analyze the data. The TMS 3 includes analysis circuitry, processor and/or functionality 40, which in some implementations further comprises and/or implements additional analysis and/or evaluation circuitry, processor and/or functionality 41. The analysis functionality 40 and/or the additionally evaluation functionality 41 can be implemented through hardware and/or software. The analysis functionality and/or the additional evaluation functionality is configured to perform additional logging, analysis, testing against rules, comparison with other downloadable data, sorting of data, and the like, in a form that is useful for other purposes, such as triggering an alarm when a rule is broken. The information from the analysis functionality 40 may include a subset of rules which cause a signal (such as a Yes/No) to be returned from the analysis functionality 40 to the TMS 3 directly, or indirectly through the monitoring functionality 9, which results in the transaction being blocked.

The monitoring can include the monitoring of data transactions relative to criteria. When header information, meta data, payload, and/or other such information of data transactions has a predefined relationship to one or more criterion, the monitoring functionality 9 can cause information to be recorded and/or communicated to the second server 10. Similarly, the analysis functionality 40 and evaluation functionality 41 can analyze and evaluate data transactions relative to one or more rules, and initiate one or more actions in response to identifying a predefined relationship between one or more data transactions and one or more rules.

In some implementations and/or under specified conditions, the analysis functionality 40 may cause the TMS 3 to send information and/or reports about the data transaction, including whether or not the transaction was blocked, to third-party recipient 12. When requested connectional information is received by the TMS 3 as input from the server 8 via the WAN 7, and when rules established by the analysis functionality 40 are in agreement, the TMS 3 passes the requested connectional information back through the tunnel 20 to the appropriate application residing on the local computing device 1, thereby completing the data transaction request.

The TMS and corresponding tunnel may further be implemented to notify a user, owner of the computing device, third party, or the like in the event that someone attempts to circumvent, uninstall, disable and/or modify the operation of the TMS and/or tunnel. In some instances the TMS and/or tunnel, in accordance with some embodiments, is such that a code, password, priority user access or other such measures are required to enable the TMS and/or the tunnel to be uninstalled, circumvented, disabled, modify operation, or the like. This special code, password or the like may be made available to a user from a third party, such as by contact with a licensor, distributor or seller of the TMS and/or tunnel programs. Further, a notification can be sent to a user, owner of the computing device, third party service or the like may be notified, for example when the special code is obtained by a user, when the special code is entered into the computing device, when a user attempts to uninstall, circumvent, disable or modify the operation of the TMS and/or tunnel without the special code. The notification can be by e-mail, phone, web site, text message, reported in a log, fax, and/or other such notification. In some instances, the notification is communicated and subsequent authorization is needed from the owner, third party service or the like before instructions are executed to uninstall, circumvent, disable or modify operation. Accordingly, in some embodiments the TMS and/or tunnel is further configured to detect an unauthorized access to perform one of circumventing, uninstalling, disabling and modifying the operation of the TMS and/or tunnel, and to cause a notification of the unauthorized access to be communicated to predefined recipient.

In some applications, when the computing device 1 is not connected to a communication network (e.g., Internet) when an attempt is made to uninstalled, disabled, or modify the TMS and/or tunnel, and/or a user attempts to use the special code or password, a message may be stored in a buffer for later transmittal when the computing device is again connected to a relevant communication network. Additionally in some instances access to the Internet may be prevented and/or access may be limited to only one or more predefined sites. Still further in some applications, when a user attempts to uninstall, circumvent, disable or modify the TMS and/or tunnel without the special code and when the computing device is not connected to the communication network, programming will subsequently block access to the Internet and/or limit access to one or more specific sites until the special code is obtained and entered.

In some embodiments, the servers 8 and/or 10 are implemented through a cluster of servers, or a separate computing device.

Figure 5:
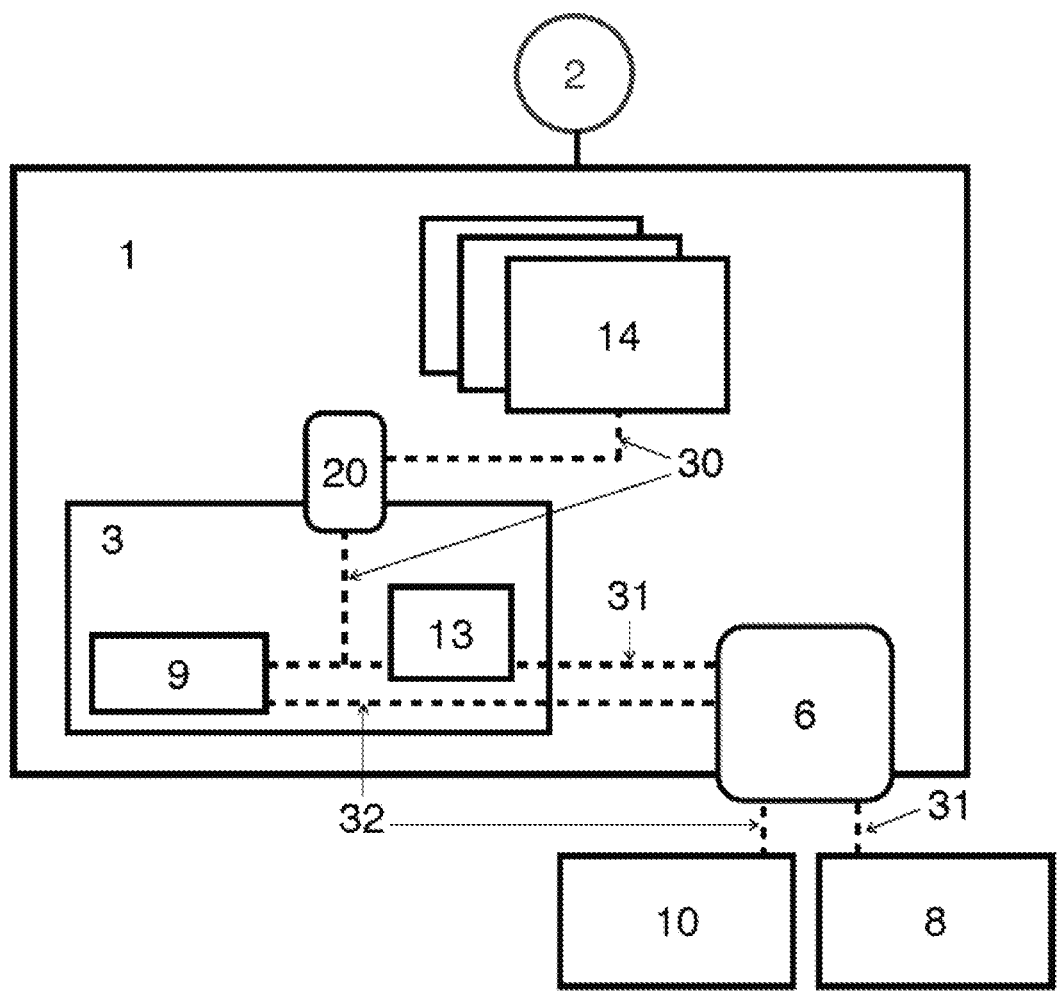
FIG. 5 illustrates a simplified block diagram of an exemplary system implementing the Tunnel Monitoring Service (TMS) on a mobile computing device, in accordance with some embodiments.

FIG. 5 illustrates a simplified block diagram of an exemplary system implementing the Tunnel Monitoring Service (TMS) 3 on a mobile computing device 1, in accordance with some embodiments. The computing device 1 is used by one or more selected users 2. Typically, the local computing device 1 includes and/or has installed thereon a number of various applications 14 (e.g., web browser application, mapping application, financial application, etc.). In some embodiments, the TMS 3 is implemented through hardware and/or software, and typically is implemented on the local computing device 1. The TMS 3 can either come pre-installed on the computing device 1 or be installed at a later time either voluntarily or involuntarily by the user 2.

The system provides an actual network I/O interface 6 (e.g., such as a cellular, WiFi, Ethernet interface, etc.) to one or more external distributed communication networks, and allows communication with one or more remote servers and/or services 8, 10 with which local applications 14 may attempt to communicate. The monitoring functionality 9 provides at least some of the monitoring and reporting component of TMS. Communications 32 with the second remote server 10 can in part allow for one or more of remote logging, analysis, action commands and the like. The packet intermediary component 13 helps to mediate communications between one or more remote servers 8 and local applications 14 such that they believe they are talking to each other. The local applications 14 are configured to engage in network communication with remote servers 8. The tunnel interface 20 directs at least the output data transactions to the TMS 3 and in some instances is a system-provided virtual network interface. Further illustrated in this exemplary embodiments are data transaction communication paths 30, 31 and 32. The data transaction paths represent inbound and outbound data transactions transmitted between or through components of the system. For example, in some embodiments application data transactions 30 of network traffic are sent and received by the applications 14. The outbound data transactions are routed by the system via the tunnel 20 and directed unmodified to the TMS 3. In some embodiments, these communications from the applications 14 are routed to the packet intermediary component 13 and/or the monitoring component. Network communications, which typically include the re-packetized data transactions, are sent between the packet intermediary component 13 to and from the appropriate remote servers 8 via the network I/O interface 6. The network traffic 32 sent between the monitoring functionality 9 and/or reporting component to the monitoring and analysis server 10 are typically communicated via the physical I/O interface 6, with the monitoring functionality 9, when implemented on the TMS, monitoring the application data transactions 30. Further, the monitoring may be reported to the server 10 via network traffic 32.

Figure 6:
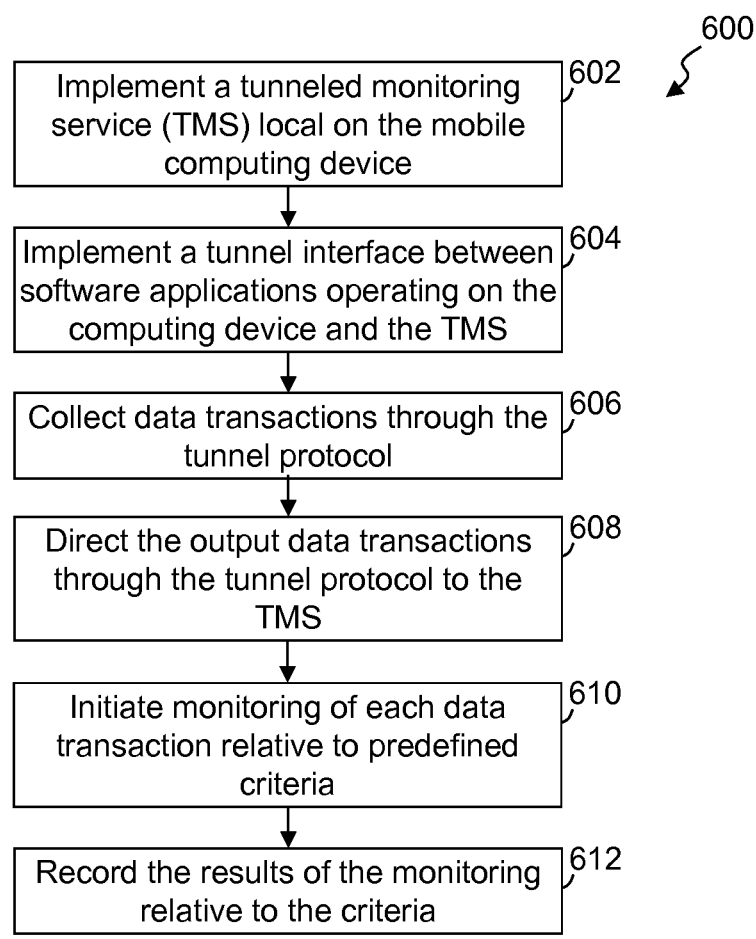
FIG. 6 illustrates a simplified flow diagram of an exemplary process of monitoring network communications, in accordance with some embodiment.

FIG. 6 illustrates a simplified flow diagram of an exemplary process 600 of monitoring network communications, in accordance with some embodiments. In step 602, a tunneled monitoring service (TMS) 3 is implemented local on the mobile computing device 1. In step 604, a tunnel interface is implemented, through a tunnel protocol within the mobile computing device, between software applications 14 operating on the computing device and the TMS 3. In step 606, output data transactions, which are communicated by the software applications 14 and intended to be externally communicated from the computing device 1 over one or more distributed communication networks, are collected through the tunnel protocol.

In step 608, the output data transactions are directed, through the tunnel protocol, to the TMS 3. In step 610, the TMS initiates monitoring of each output data transaction relative to predefined criteria to identify relevant parameter information, which are obtained from one or more of the output data transactions, that have a predefined relationship with one or more of the criteria. In step 612, results of the monitoring relative to the criteria are recorded. In some instances, the TMS causing the results to be recorded locally and/or remotely, while in other instances a remote server 10 may record the results.

Some embodiments further open, through the TMS 3 local on the mobile computing device 1, raw data packets of the output data transactions from the tunnel interface 20 enabling evaluations (e.g., monitoring, analysis, etc.) of the data packets. The TMS may further cause the re-packetizing of a payload of each of the data packets producing re-packetized data packets, cause the re-packetized data packets to be communicated from the computing device and over the communication network 7 to one or more intended external computing devices (e.g., server 8). The TMS 3 can further receive input data transactions directed to the TMS in response to the communication of the re-packetized data packets from one or more external computing devices 8. The input data transactions can include input data packets. The TMS can initiate monitoring of each of the input data packets relative to the criteria to identify relevant parameter information from the input data packets that have a pre-defined relationship with one or more of the criteria. The results of the monitoring relative to the criteria can be recorded. Again, in some instances, the TMS causes the results to be recorded locally and/or remotely, while in other instances a remote server 10 may record the results.

Further, in some applications, the TMS receives the input data packets local on the computing device 1. The payload of each of the input data packets can be re-packetized providing re-packetized input data packets. The TMS can cause the re-packetized input data packets to be internally communicated within the computing device from the TMS to one or more of the relevant applications 14 intended to receive the input data packet. The TMS may, in some instances, modify a payload of one or more input data packets in response to an identification that data of the first input data packet has a predefined relationship with one or more rules. In some embodiments, the re-packetizing can include re-packetizing the modified payload of an input data packet in place of the payload of the first input data packet. The monitoring, in some instances, can include activating software of the TMS to implement the monitoring of one or more input and/or output data transactions relative to the criteria and identify the relevant parameters that have the predefined relationship relative to the criteria. Additionally or alternatively, the TMS can initiate the monitoring by causing one or more data packets to be communicated over the network to an external service configured to monitor data packets relative to additional criteria and to cause the results of the monitoring to be recorded.

Some embodiments additionally or alternatively analyze data transactions. in some instances, the TMS analyzes data packets of one or more data transactions relative to one or more rules, and identifies when a data packet has a pre-defined relationship with at least one of the one or more rules. One or more actions associated with the one or more rules can be identified, and the TMS can cause the one or more actions to be implemented in response to identifying a data packet which has a predefined relationship with one or more rules. The one or more actions can include, for example, modifying a payload of one or more data packets that includes data that has a predefined relationship with the at least one of the one or more rules. The modified payload of the data packet can be re-packetized providing a re-packetized data packet that includes the modified payload.

The TMS can cause the re-packetized data packet to be communicated from the computing device 1 and over the communication network 7 to an intended external computing device.

The TMS may communicate over the communication network multiple data transactions to an evaluation service that receives and analyzes the data transactions relative to one or more rules. One or more action instructions may be received corresponding to one or more of the data transactions from the evaluation service based on the evaluation of the multiple data packets relative to the one or more rules. The TMS can cause the one or more action instructions to modify one or more data transactions. Similarly, the TMS may perform an analysis of the one or more data transactions relative to one or more rules defined on the TMS. The TMS can prevent access to an external, intended recipient service and prevent one or more data transactions from being communicated from the computing device 1 to the intended recipient service in response to the analysis of the one or more data transactions intended to be communicated to the intended recipient service.

Figure 7:
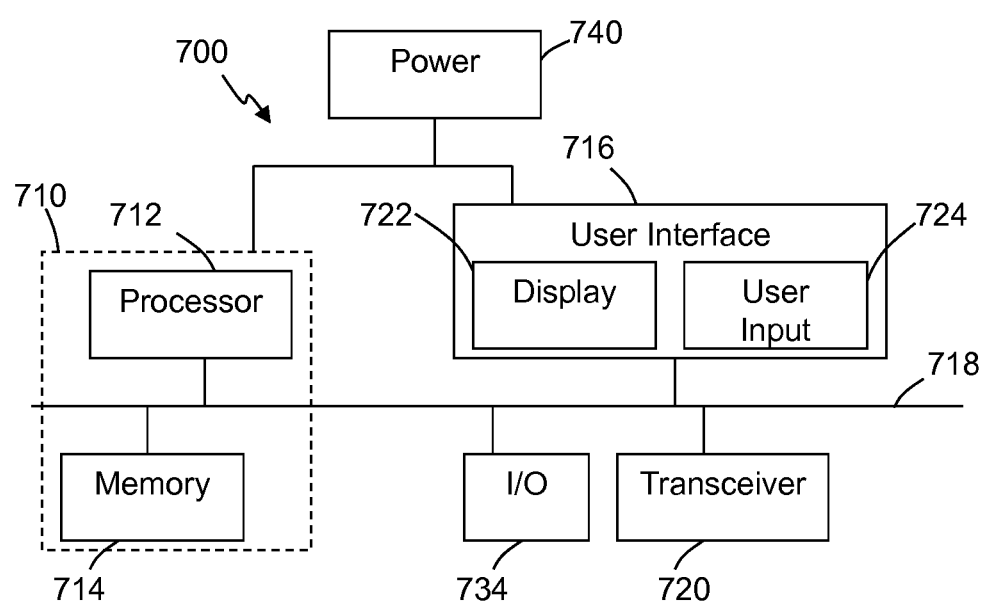
FIG. 7 illustrates an exemplary system for use in implementing methods, techniques, devices, apparatuses, systems, servers, sources and the like in monitoring external data requests of a computing device, in accordance with some embodiments.

Further, the processes, methods, techniques, circuitry, systems, devices, functionality, services, servers, sources and the like described herein may be utilized, implemented and/or run on many different types of devices and/or systems. Referring to FIG. 7, there is illustrated an exemplary system 700 that may be used for any such implementations, in accordance with some embodiments. One or more components of the system 700 may be used for implementing any circuitry, system, functionality, apparatus or device mentioned above or below, or parts of such circuitry, functionality, systems, apparatuses or devices, such as for example any of the above or below mentioned computing device 1, TMS 3, request processing functionality 5, monitoring functionality 9, blocking functionality 15, analysis functionality 40, additionally evaluation functionality 41 and/or other such circuitry, functionality and/or devices. However, the use of the system 700 or any portion thereof is certainly not required.

By way of example, the system 700 may comprise a controller or processor module, memory 714, and one or more communication links, paths, buses or the like 718. Some embodiments may include a user interface 716, and/or a power source or supply 740. The controller 712 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, programs, content, listings, services, interfaces, logging, reporting, etc. Further, in some embodiments, the controller 712 can be part of control circuitry and/or a control system 710, which may be implemented through one or more processors with access to one or more memory 714. The user interface 716 can allow a user to interact with the system 700 and receive information through the system. In some instances, the user interface 716 includes a display 722 and/or one or more user inputs 724, such as a buttons, touch screen, track ball, keyboard, mouse, etc., which can be part of or wired or wirelessly coupled with the system 700.

Typically, the system 700 further includes one or more communication interfaces, ports, transceivers 720 and the like allowing the system 700 to communication over a communication bus, a distributed network, a local network, the Internet, communication link 718, other networks or communication channels with other devices and/or other such communications or combinations thereof. Further the transceiver 720 can be configured for wired, wireless, optical, fiber optical cable or other such communication configurations or combinations of such communications. Some embodiments include one or more input/output (I/O) ports 734 that allow one or more devices to couple with the system 700. The I/O ports can be substantially any relevant port or combinations of ports, such as but not limited to USB, Ethernet, or other such ports.

The system 700 comprises an example of a control and/or processor-based system with the controller 712. Again, the controller 712 can be implemented through one or more processors, controllers, central processing units, logic, software and the like. Further, in some implementations the controller 712 may provide multiprocessor functionality.

The memory 714, which can be accessed by the controller 712, typically includes one or more processor readable and/or computer readable media accessed by at least the controller 712, and can include volatile and/or nonvolatile media, such as RAM, ROM, EEPROM, flash memory and/or other memory technology. Further, the memory 714 is shown as internal to the system 710; however, the memory 714 can be internal, external or a combination of internal and external memory. Similarly, some or all of the memory 714 can be internal, external or a combination of internal and external memory of the controller 712. The external memory can be substantially any relevant memory such as, but not limited to, one or more of flash memory secure digital (SD) card, universal serial bus (USB) stick or drive, other memory cards, hard drive and other such memory or combinations of such memory. The memory 714 can store code, software, executables, scripts, data, content, lists, programming, programs, log or history data, user information and the like.

Some embodiments provide systems that monitor network communications (e.g., Internet communications) and/or network use of a selected user to and/or from a computing device 1. A tunneled monitoring service (TMS) 3 is installed on the computing device that receives data transaction requests from the computing device through a tunnel interface 20. The TMS can be configured to process data transaction requests received through the tunnel interface. Typically, the TMS 3 is communicatively connected to a communication network 7 (e.g., a WAN, LAN, the Internet, etc.), and has the capability of completing the data transaction requests. The TMS can communicationally connect with one or more remote servers 10 that are configured to provide information useful in determining the nature of one or more data transaction requests. In some implementations, the TMS includes and/or has access to monitoring software that can monitor network access activity to and/or from the computing device, which is typically activated by the user. The monitoring can include monitoring the network activity of applications 14 installed on the computing device 1. The monitoring program is typically further configured to record the results of the monitoring of the network access activity locally on the computing device and/or at a remote server and/or service. The network activity can include substantially any relevant network activity such as, but not limited to, access to at least one network activity from a group consisting of http, https, network news transfer protocols, file sharing programs, file transfer protocols, chat room access, peer to peer chats, game protocols, downloads of data, electronic mail activity, and other such activity. The TMS can further, in some instances, complete a data transaction request through the tunnel interface.

The remote server may generate a report including information useful in determining the nature of the data transaction requests. The server and/or the computing device may make the report accessible by one or more third party recipients. Further, in some applications, the remote server is implemented through and/or includes a server cluster containing multiple servers that cooperatively operate and/or communicate to provide the monitoring and/or analysis functionality. In other instances, the remote server may be implemented in part or fully on personal computer. In some embodiments, the remote server includes a processing program that analyzes the content and/or payloads of the network access activity (e.g., data transactions) and assigns a score to each of the network access activity. The score and/or the content of the network activities provides an indication of whether the network access activity is considered an objectionable activity.

The TMS can further block access to the network access activity when the network access activity is considered an objectionable activity. The determination of objectionable activity, in some implementations, includes an analysis of data transactions and/or payloads of data packets of data transactions relative to one or more rules. As such, objectionable activity may be identified as a violation of criteria defined by prescribed rules established and/or maintained on the computing device and/or at the remote server. In some embodiments, the system allows a user, owner of the computing device, owner of a service providing network access and/or other such entities to establish a set of rules and/or criteria. The TMS can then block network access activity when the established rules and/or criteria are met. Rules and/or criteria can include, but are not limited to, specified keywords, one or more domains, date, time, and Internet Protocol (IP) addresses, and other such rules and/or criteria.

The TMS (e.g., processing program) and/or a remote server can generate a report of the network access activity. The report can include, for example, a list of recorded network access activity, a score assigned to each recorded network access activity, corresponding rules and/or criteria considered, corresponding rules violated, corresponding criteria meet, and other such information. The report may be made accessible by a user being monitored, a corporation or other entity requesting the monitoring, one or more third party recipients and the like. Similarly, the report may be communicated to a user being monitored, a corporation or other entity requesting the monitoring, one or more third party recipients, and the like. In some implementations, the report may display a list of recorded network access activity, which may be sorted based on one or more parameters, such as by score, IP address, data size, rules violated, criteria meet, by time, by date, other such parameters, or combination of two or more of such parameters. For example, the report may display the list of recorded network access activity sorted chronologically. In some implementations, the report can include multiple portions with one portion including one or more links to one or more other portions.

Further, as introduced above, in some embodiments the monitoring and/or analysis can include assigning one or more ratings, scores or the like to one or more of the network access activity. The score can include a numeric score and/or a relative score. For example, the relative score ca be a letter or other symbol.

Third party recipients can access one or more reports in a variety of ways including, but not limited to, the report or reports being communicated by one or more of the remote servers, the third party having access to the remote server to request report, and other such methods. A request for a report can include viewing the report while the third party has access to the remote server.

In some implementations, monitoring software is installed on the computing device 1, and in some embodiments is part of the TMS 3. Additionally or alternatively, some or all of the monitoring and/or monitoring program is implemented at a remote server (e.g., server 10). In some applications, the monitoring software can be voluntarily installed on the computing device 1 by a user. In other instances, the monitoring software can be pre-installed on the computing device.

Further, some embodiments provide systems for monitoring network use by one or more selected users. The system can include a computing device having installed thereon a tunneled monitoring service (TMS) 3 that receives data transaction requests from the computing device through a tunnel interface 20. The TMS 3 processes data transaction requests received through the tunnel interface. Additionally, the TMS is typically communicatively connected to a communication network (e.g., WAN, LAN, Internet, etc.), and has the capability of completing the data transaction requests. In some implementations, the TMS includes a processing program capable of providing information to a third party recipient. The processing program is capable of communicating results of processing to other portions of the TMS. For example, the processing program is configured to provide information useful in determining the nature of the data transaction request.

In some embodiments, the TMS has access to monitoring software that is configured to monitor network access activity of a user. This monitoring can further including the network activity of applications 14 installed on the computing device. The monitoring program can record the results of the monitoring of the network access activity on the computing device and in some instances within the processing program. The network access activity can includes, for example, access to one or more of the network activity from a group consisting of http, https, network news transfer protocols, file sharing programs, file transfer protocols, chat room access, peer to peer chats, game protocols, downloads of data, and electronic mail activity. The TMS 3 can complete the data transaction request through the tunnel interface. The processing program can generate a report including information useful in determining the nature of the data transaction requests. In some implementations, the report can be made accessible by a third party recipient (e.g., via direct access through a server 10, e-mail, periodic reports, text alerts, etc.). In some embodiments, the processing program is configured to analyze the content of each network access activity and assign a score to each of the recorded network access activity. The score and the content provides an indication of whether the network access activity is considered an objectionable activity.

In some instances, the TMS blocks access to the network access activity and/or a server when the access activity is considered an objectionable activity. The analysis in identifying objectionable activity can include detecting a violation of one or more criteria defined by prescribed rules established in the processing program and/or external analysis rules. Again, the objectionable activity can be a violation of prescribed rules established in the TMS, remote server prescribed rules or the like. In some instances, a user can establish the set of criteria, which may include causing the TMS to block the network access activity when the user-established criteria are met.

Criteria considered by the monitoring functionality and/or the remote server can include, but is not limited to, one or more of specified keywords, domains, date, time, IP address of network access activity, and other such criteria. The objectionable activity can be determined by violation of rules for data transaction requests that can include, but are not limited to, one or more of keywords, domains, date, time, and network address of said data transaction request, and the like. Some embodiments generate one or more reports based on the monitoring and/or the analysis. The report can include, for example, a list of recorded network access activity and scores assigned to of the recorded network access activity. The report can display the list sorted by said score, sorted chronologically, or other such sorting, or combination of such sorting. The report may include portions and one or more portions may include a link to one or more other portions. The scoring can be a numeric score and/or a relative score. Further, the relative score may be a letter or other symbol.

Again, third party recipients may have access to the report. Access may be achieved through one or more ways, such as but not limited to one or more of said processing program sending the report, the third party having access to the processing program to request the report. A request may include viewing the report while the third party has access to the processing program. In some applications, the monitoring functionality is implemented at least in part through software installed on the computing device 1. Additionally or alternatively, some or all of the monitoring is implemented at a remote server 10 communicatively connected with the TMS. The monitoring software may be voluntarily installed on the computing device by a selected user. In other instances, the monitoring software is pre-installed on the computing device.

One or more of the embodiments, methods, processes, approaches, and/or techniques described above or below may be implemented in one or more computer programs executable by a processor-based system. By way of example, such a processor based system may comprise the processor based system 700, a computer, a server, a smart phone, a table, a laptop, etc. Such a computer program may be used for executing various steps and/or features of the above or below described methods, processes and/or techniques. That is, the computer program may be adapted to cause or configure a processor-based system to execute and achieve the functions and/or functionality described above or below. For example, such computer programs may be used to monitor a local computing device and, in particular, monitor a local computing device by capturing all packets of data requests intended to be communicated from and/or to the local computing device, analyzing the packets of the local computing device, and completing a predetermined requested data transaction. As another example, such computer programs may be used to monitor a local computing device and, in particular, monitor a local computing device by capturing all packets on a local computing device, analyzing the packets from the local computing device, and completing a predetermined requested data transaction. As yet another example, such computer programs may be used for implementing any type of tool or similar utility that uses any one or more of the above or below described embodiments, methods, processes, functionality, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, functionality, approaches, and/or techniques described herein. For example, some embodiments provide one or more computer-readable storage mediums storing one or more computer programs for use with a computer simulation, the one or more computer programs configured to cause a computer and/or processor based system to execute steps comprising: receiving data through a tunneled monitoring service (TMS) that receives data transaction requests, from a local computing device on which the TMS is implemented, through a tunnel interface; and processing, through the TMS, data transaction requests received through said tunnel interface. Some embodiments further comprise completing said data transaction requests through the TMS that is communicatively connected via a wide area network (WAN) to a remote server which is communicatively connected to said TMS; wherein said remote server is configured to provide information useful in determining a nature of said data transaction request. Some embodiments additionally or alternatively comprise monitoring network access activity of the local computing device, including network activity of applications installed on said local computing device; recording results of monitoring said Internet access activity within said remote server. Additionally, some embodiments further comprise completing a data transaction request, by the TMS, through a tunnel interface. Further, in some instances, the Internet access activity can include access to at least one Internet activity from a group consisting of http, https, network news transfer protocols, file sharing programs, file transfer protocols, chat room access, peer to peer chats, game protocols, downloads of data, and electronic mail activity.

In some embodiments, systems, apparatuses and methods are provided herein useful to obtain product information through scanning In some embodiments, a method performed by a circuit and/or one or more processors comprises receiving, through a tunnel interface and by a tunneled monitoring service (TMS), data transaction requests from a local computing device on which the TMS is implemented; processing, by the TMS, the data transaction requests received through said tunnel interface; and completing said data transaction requests through a communication connection with a wide area network (WAN).

Some embodiments further comprise providing information to a third party recipient through processing functionality and/or programming of the TMS. Further, some embodiments comprise communicating, through the processing functionality, results of the processing to other portions of the TMS. Additionally or alternatively, some embodiments comprise providing, through the processing functionality, information useful in determining a nature of the data transaction request Some embodiments further comprise monitoring network access activity of the local computing device through monitoring circuitry and/or functionality of the TMS. In some instances, the network access activity comprises network activity of applications installed on the local computing device. Further, some embodiments comprise recording results of monitoring the network access activity within the processing functionality. The network activity comprises, in some embodiments, network activity from one or more of and/or a group consisting of http, https, network news transfer protocols, file sharing programs, file transfer protocols, chat room access, peer to peer chats, game protocols, downloads of data, and electronic mail activity. Further, some embodiments comprise completing the data transaction, by the TMS, through the tunnel interface.

In some embodiments, one or more of the circuitry and/or functionality may be implemented external to the TMS and/or the TMS may be implemented through distinct circuitry, processors and/or functionality. For example, in some implementations, the monitoring functionality 9 may reside on the local computing device 1 independent from the TMS 3, and be configured to send and receive data to the TMS 3. Accordingly, the spirit and scope of the present embodiments is not to be limited to the specific embodiments described.

Some embodiments provide services and methods that monitor a local computing device and, in particular, monitor a local computing device by capturing all packets of data requests intended to be communicated from the local computing device, analyzing the packets of the local computing device, and completing a predetermined requested data transaction.

Further, some embodiments provide services and methods that monitor a local computing device and, in particular, monitor a local computing device by capturing all packets on a local computing device, analyzing the packets from the local computing device, and completing a predetermined requested data transaction.

While the present embodiments have been disclosed in connection with the preferred embodiments shown and described in detail, various modifications and improvements thereon will become readily apparent to those skilled in the art.

What is claimed is:

1. A system to monitor network communications, comprising:
   a computing device comprising a control circuit and memory coupled with the control circuit and computer instructions that when executed by the control circuit cause the control circuit to implement:
   a tunneled monitoring service (TMS) operated local on the computing device; and
   a tunnel protocol within the computing device that is configured to establish a tunnel interface between software applications operating on the computing device and the TMS,
   wherein the tunnel interface is configured to collect output data transactions, communicated by the software applications and intended to be externally communicated from the computing device over a communication network, and direct the output data transactions to the TMS;
   wherein the TMS is configured to initiate monitoring of one or more output data transactions relative to pre-defined criteria to identify relevant parameter information, obtained from one or more of the output data transactions, that have a predefined relationship with one or more of the criteria, and cause results of the monitoring relative to the criteria to be recorded,
   wherein the TMS is configured:
   open, local on the computing device, raw data packets of the output data transactions from the tunnel interface;
   cause a re-packetizing of a payload of one or more of the data packets producing re-packetized data packets;
   cause the re-packetized data packets to be communicated from the computing device and over the communication network to one or more intended external computing servers;
   receive input data transactions comprising input data packets from at least one of the one or more external computing servers and directed to the TMS in response to the communication of the re-packetized data packets;
   initiate a monitoring of one or more of the input data packets relative to the criteria to identify relevant parameter information from one or more of the input data packets that have a predefined relationship with one or more of the criteria, and cause results of the monitoring relative to the criteria to be recorded;
   receive, local on the computing device, the input data packets;
   re-packetize a payload of one or more of the input data packets providing re-packetized input data packets;
   cause the re-packetized input data packets to be internally communicated within the computing device from the TMS to a first application intended to receive the input data packets.

2. The system of claim 1, wherein the TMS is further configured to:
   receive, at the TMS, input data transactions comprising input data packets from an external computing server;
   modify a payload of at least a first input data packet, of the input data packets, in response to an identification that data of the first input data packet has a predefined relationship with one or more rules;
   re-packetizing the modified payload of the first input data packet in place of the payload of the first input data packet; and
   cause the re-packetized first input data packet to be internally communicated within the computing device from the TMS to a first application intended to receive the first input data packet.

3. The system of claim 1, wherein the TMS in initiating the monitoring of the output data transactions is configured to:
   communicate over the communication network one or more data packets of the output data transaction to an external service configured to monitor data packets relative to the criteria and to record the results of the monitoring.

4. The system of claim 1, wherein the TMS is further configured to:
   communicate over the communication network multiple of the output data transactions to an evaluation service configured to receive and analyze the data transactions relative to one or more rules;
   receive action instructions corresponding to one or more of the data transactions from the evaluation service based on the evaluation of the multiple data packets relative to the one or more rules; and
   implement, local on the computing device, the instructions to modify the one or more data transactions.

5. The system of claim 1, wherein the TMS is further configured to:
   perform an analysis of the one or more data transactions relative to one or more rules defined on the TMS; and
   prevent, local on the computing device, access to an external, intended recipient service and prevent one or more data transactions from being communicated from the computing device to the intended recipient service in response to the analysis of the one or more data transactions intended to be communicated to the intended recipient service.

6. The system of claim 1, wherein the TMS is further configured to detect an unauthorized access to perform one of circumventing, uninstalling, disabling and modifying the operation of the TMS, and to cause a notification of the unauthorized access to be communicated to predefined recipient.

7. The system of claim 1, wherein the TMS is further configured to inhibit transmission of a monitored output data transaction that includes at least one of predefined nudity and profanity to prevent a payload of one or more output data transactions from reaching a requesting application.

8. The system of claim 1, wherein the TMS is further configured to monitor for predefined content with one or more of the criteria that includes at least one of predefined symbols, derogatory words, customer names, competitor names; and is configured to prevent the communication of the predefined content.

9. A method of monitoring network communications, comprising: by a control circuit of a computing device:

implementing, local on the computing device, a tunneled monitoring service (TMS); implementing, through a tunnel protocol within the computing device, a tunnel interface between software applications operating on the computing device and the TMS;

collecting, through the tunnel protocol, output data transactions communicated by the software applications and intended to be externally communicated from the computing device over a communication network; directing, by the tunnel protocol, the output data transactions to the TMS; initiating, by the TMS, monitoring, local on the computing device, the content of output data transaction relative to predefined criteria to identify relevant parameter information, obtained from one or more of the output data transactions, that have a predefined relationship with one or more of the criteria;

causing results of the monitoring relative to the criteria to be recorded;

opening, through the TMS local on the computing device, raw data packets of the output data transactions from the tunnel interface;

causing a re-packetizing of a payload of one or more of the data packets producing re-packetized data packets;

causing the re-packetized data packets to be communicated from the computing device and over the communication network to one or more intended external computing server;

receiving, at the TMS, input data transactions comprising input data packets from at least one of the one or more external computing servers and directed to the TMS in response to the communication of the re-packetized data packets;

initiating a monitoring of each of the input data packets relative to the criteria to identify relevant parameter information from one or more of the input data packets that have a predefined relationship with one or more of the criteria, and cause results of the monitoring relative to the criteria to be recorded;

receiving, through the TMS and local on the mobile computing device, the input data packets;

re-packetizing a payload of each of the input data packets providing re-packetized input data packets; and causing the re-packetized input data packets to be internally communicated within the computing device from the TMS to a first application intended to receive the input data packets.

10. The method of claim 9, further comprising:

receiving, at the TMS, input data transactions comprising input data packets from an external computing server;

modifying, in the TMS, a payload of at least a first input data packet, of the input data packets, in response to an identification that data of the first input data packet has a predefined relationship with one or more rules; and re-packetizing the modified payload of the first input data packet in place of the payload of the first input data packet; and causing the re-packetized first input data packet to be internally communicated within the computing device from the TMS to a first application intended to receive the first input data packet.

11. The method of claim 9, wherein the initiating the monitoring of the output data transactions comprises communicating over the communication network one or more data packets of the output data transaction to an external service configured to monitor data packets relative to the criteria and to record the results of the monitoring.

12. The method of claim 9, further comprising:

communicating over the communication network multiple of the output data transactions to an evaluation service configured to receive and analyze the data transactions relative to one or more rules;

receiving one or more action instructions corresponding to one or more of the data transactions from the evaluation service based on the evaluation of the multiple data packets relative to the one or more rules; and implementing, through the TMS and local on the computing device, the one or more action instructions to modify the one or more data transactions.

13. The method of claim 9, further comprising:

performing, in the TMS, an analysis of the one or more data transactions relative to one or more rules defined on the TMS; and preventing, local on the computing device, access to an external, intended recipient service and prevent one or more data transactions from being communicated from the computing device to the intended recipient service in response to the analysis of the one or more data transactions intended to be communicated to the intended recipient service.

14. The method of claim 9, further comprising inhibiting transmission of a monitored output data transaction that includes at least one of predefined nudity and profanity to prevent a payload of one or more output data transactions from reaching a requesting application.

15. The method of claim 9, wherein the step of monitoring the content of each output data transaction includes the steps of:

monitoring for predefined content with one or more of the criteria that includes at least one of predefined symbols, derogatory words, customer names, competitor names; and further comprises the step of preventing the communication of the predefined content.

* * * * *